US007143227B2

(12) United States Patent
Maine

(10) Patent No.: US 7,143,227 B2
(45) Date of Patent: Nov. 28, 2006

(54) BROADCAST BRIDGE APPARATUS FOR TRANSFERRING DATA TO REDUNDANT MEMORY SUBSYSTEMS IN A STORAGE CONTROLLER

(75) Inventor: Gene Maine, Longmont, CO (US)

(73) Assignee: Dot Hill Systems Corporation, Carlsbad, CA (US)

( * ) Notice: Subject to any disclaimer, the term of this patent is extended or adjusted under 35 U.S.C. 154(b) by 398 days.

(21) Appl. No.: 10/368,688

(22) Filed: Feb. 18, 2003

(65) Prior Publication Data

US 2004/0177126 A1 Sep. 9, 2004

(51) Int. Cl.
*G06F 13/36* (2006.01)
(52) U.S. Cl. ............... 710/306; 710/305; 710/107; 714/6
(58) Field of Classification Search ........ 710/305–306, 710/311–315, 107; 714/6
See application file for complete search history.

(56) References Cited

U.S. PATENT DOCUMENTS

| | | | |
|---|---|---|---|
| 4,217,486 A | 8/1980 | Tawfik et al. | |
| 4,428,044 A | 1/1984 | Liron | |
| 5,345,565 A | 9/1994 | Jibbe et al. | |
| 5,483,528 A | 1/1996 | Christensen | |
| 5,530,842 A | 6/1996 | Abraham et al. | |
| 5,619,642 A | 4/1997 | Nielson et al. | |
| 5,668,956 A | 9/1997 | Okazawa et al. | |
| 5,680,579 A | 10/1997 | Young et al. | |
| 5,812,754 A | 9/1998 | Lui et al. | |
| 5,881,254 A * | 3/1999 | Corrigan et al. | 710/306 |
| 6,038,680 A | 3/2000 | Olarig | |
| 6,094,699 A | 7/2000 | Surugucchi et al. | |
| 6,098,140 A | 8/2000 | Pecone et al. | |
| 6,185,652 B1 | 2/2001 | Shek et al. | |
| 6,243,829 B1 | 6/2001 | Chan | |
| 6,272,533 B1 | 8/2001 | Browne | |
| 6,397,293 B1 | 5/2002 | Shrader et al. | |

(Continued)

FOREIGN PATENT DOCUMENTS

EP      0 817 054      6/1997

(Continued)

OTHER PUBLICATIONS

Young et al. *A high I/O reconfigurable crossbar switch.* 11th Annual IEEE Symposium on Field-Programmable Custom Computing Machines, 2003. FCCM 2003. Apr. 9-11, 2003. pp. 3-10.

(Continued)

*Primary Examiner*—Rehana Perveen
*Assistant Examiner*—Kim T. Huynh
(74) *Attorney, Agent, or Firm*—E. Alan Davis; James W. Huffman

(57) ABSTRACT

A bus bridge apparatus for performing broadcasted writes to redundant memory subsystems in a network storage controller is disclosed. The bus bridge includes a PCI-X target that receives a write command on a first PCI-X bus on one side of the bridge. The target is coupled to two PCI-X masters coupled to primary and secondary memory subsystems by respective PCI-X buses on the other side of the bridge. A first FIFO buffers the write command data between the target and the first master, and a second FIFO buffers a copy of the data between the target and the second master. The first and second masters concurrently retransmit the write command on their respective PCI-X buses to the primary and secondary memory subsystems. However, the second master only retransmits if broadcasting is enabled and the write command address is in a broadcast address range known by the bus bridge.

35 Claims, 9 Drawing Sheets

Computer Network

U.S. PATENT DOCUMENTS

| | | | |
|---|---|---|---|
| 6,421,769 | B1 | 7/2002 | Teitenberg et al. |
| 6,470,429 | B1 | 10/2002 | Jones et al. |
| 6,493,795 | B1 | 12/2002 | Tung et al. |
| 6,502,157 | B1 * | 12/2002 | Batchelor et al. ............ 710/310 |
| 6,507,581 | B1 | 1/2003 | Sgammato |
| 6,629,179 | B1 * | 9/2003 | Bashford ................... 710/260 |
| 6,718,408 | B1 | 4/2004 | Esterberg et al. |
| 6,839,788 | B1 | 1/2005 | Pecone |
| 7,069,368 | B1 | 6/2006 | Thornton |
| 2001/0013076 | A1 | 8/2001 | Yamamoto |
| 2002/0029319 | A1 | 3/2002 | Robbins et al. |
| 2002/0069317 | A1 | 6/2002 | Chow et al. |
| 2002/0069334 | A1 | 6/2002 | Hsia et al. |
| 2002/0083111 | A1 | 6/2002 | Row et al. |
| 2002/0091828 | A1 | 7/2002 | Kitamura et al. |
| 2002/0099881 | A1 | 7/2002 | Gugel |
| 2002/0194412 | A1 | 12/2002 | Bottom |
| 2003/0065733 | A1 | 4/2003 | Pecone |
| 2003/0065836 | A1 | 4/2003 | Pecone |
| 2004/0177126 | A1 | 9/2004 | Maine |
| 2005/0102557 | A1 | 5/2005 | Davies et al. |

FOREIGN PATENT DOCUMENTS

| | | |
|---|---|---|
| EP | 0800138 A | 10/1997 |
| EP | 0817054 | 1/1998 |
| GB | 2396726 A | 6/2004 |
| JP | 2001142648 | 5/2001 |

OTHER PUBLICATIONS

Landman et al. *Activity-sensitive architectural power analysis*. IEEE Transactions on Computer-Aided Design of Integrated Circuits and Systems. Jun. 1996. pp. 571-587.

U.S. Office Action for U.S. Appl. No. 09/967,027, Apr. 30, 2004, pp. 1-7 and cover sheet.

U.S. Office Action for U.S. Appl. No. 09/967,126, Mar. 7, 2005, pp. 1-5 and cover sheet.

European Examination Report for Application No. GB0406742.7, dated Nov. 10, 2004.

European Examination Report for Application No. GB0406739.3, dated Nov. 10, 2004.

European Examination Report for Application No. GB0406740.1, dated Nov. 10, 2004.

DCM Presentation. DCM Technologies, 39675 Cedar Blvd. #220, Newark, CA 94560.

"PEX 8114: PCI-X -PCI Express Bridge." Data Book. Version 0.70. May 2004. PLX Technology, Inc.

"Corex-V10 PCI-X Initiator/Target" Datasheet #2. DCM Technologies, 39675 Cedar Blvd., #220, Newark, CA 94560.

"DCM Corex-V10 FAQ." version 1.00. DCM Technologies, 39675 Cedar Blvd., #220, Newark, CA 94560.

IDT. "24-lane 3-Port PCI Express Switch" Data Sheet. 89HPES24N3. Feb. 14, 2006. Integrated Device Technology, Inc.

"DCM PCI-X Verification Services" Datasheet #2. DCM Technologies, 39675 Cedar Blvd., #220, Newark, CA 94560.

IDT. "12-lane 3-Port PCI Express Switch" Data Sheet. 89HPES12N3. Feb. 14, 2006. Integrated Device Technology, Inc.

IDT. "12-lane 3-Port PCI Express Switch" Product Brief. 89PES12N3. Feb. 15, 2006. Integrated Device Technology, Inc.

"Intel 41210 Serial to Parallel PCI Bridge Datasheet." Intel Corporation. Sep. 2003.

"Intel 41210 Serial to Parallel PCI Bridge Design Guide." Intel Corporation. Nov. 2003.

QuickLogic PCI Presentation. "QuickPCI™ Family of Embedded Standard Products (ESPs).".

"QL5064—QuickPCI™" DataSheet, Rev B. Feb. 2, 2000. QuickLogic.

"IDT 89HPES12N3 PCI Express Switch." User Manual Table of Contents & Overview. Integrated Device Technology. Feb. 8, 2006.

"IDT 89HPES24N3 PCI Express Switch." User Manual Table of Contents & Overview. Integrated Device Technology. Feb. 8, 2006.

"PEX 8114 PCI Express to PCI/PCI-X Bridge." Product Brief. Version 2.0. 2004. PLX Technology, Inc.

"DCM PCI-X Verification Services" Datasheet #1. DCM Technologies, 39675 Cedar Blvd., #220, Newark, CA 94560.

"PCI-X Synthesizable Core." inSilicon Corporation. San Jose, CA, 1999.

"IBM 133 PCI-X Bridge" Datasheet. Apr. 6, 2001.

"IBM 133 PCI-X Bridge" Datasheet 2000. IBM Microelectronics Division.

"Tsi320™ Software Initialization Application Note." Oct. 2001. 80A600B_AN002_01. Tundra Semiconductor Corporation.

"PCI-X Bus Test Environment." 1999. inSilicon Corporation 411 East Plumeria Dr. San Jose, CA 95134.

"1005 IDT Precise PCI-Express Family Presentation." Integrated Device Technology.

"COMPAQ Rapid Enabler for PCI-X (CREX) Initiator Interface." (Preliminary). Revision 0.28 Sep. 2, 1999.

"COMPAQ Rapid Enabler for PCI-X (CREX) Target Bus Interface." (Preliminary). Revision 0.36 Sep. 2, 1999.

"Intel 41210 Serial to Parallel PCI Bridge Product Brief." Intel Corporation. 2003.

PERICOM. "Bridge Products Road Map." Customer Presentation. Pages 31, 33-35.

IDT. "24-lane 3-Port PCI Express Switch" Product Brief. 89PES24N3. Dec. 22, 2005. Integrated Device Technology, Inc.

"PEX 8104" Data Book. Version 0.61. Mar. 2004. PLX Technology, Inc.

"Tsi320™ PCI/X-to-PCI/X Bus Bridge Manual." Jan. 2001. 80A600B_MA001_02. Tundra Semiconductor Corporation.

"Tsi320™ Dual-Mode PCI-to-PCI Bus Bridge Errata." Sep. 2001. 80A600B_ER001_05. Tundra Semiconductor Corporation.

"Tsi320™ Dual-Mode PCI-to-PCI Bus Bridge User Manual." Jun. 2001. 80A600B_MA001_04. Tundra Semiconductor Corporation.

"Corex-V10 PCI-X Initiator/Target" Datasheet #1. DCM Technologies, 39675 Cedar Blvd., #220, Newark, CA 94560.

"X-caliber Design Specification: PCI-2.2/PCI-X Megacell" Rev 0.99.3. Nov. 19, 1999.

* cited by examiner

*PCI-X Bridge with Broadcast Bridges*

FIG. 6 — Broadcast Write Operation

Broadcast Write
Data Flow Example

Conventional Redundant Network Storage Controller

BROADCAST BRIDGE APPARATUS FOR TRANSFERRING DATA TO REDUNDANT MEMORY SUBSYSTEMS IN A STORAGE CONTROLLER

FIELD OF THE INVENTION

This invention relates in general to the field of mass storage systems and particularly to data transfers to redundant controllers in a mass storage system.

BACKGROUND OF THE INVENTION

Today's computer networks include vast amounts of storage, require high data throughput, and demand high data availability. Many networks support hundreds or even thousands of users connected to them. Many networks store extremely valuable data, such as bank account information, personal medical information, databases whose unavailability equates to huge sums of lost revenue due to inability to sell a product or provide a service, and scientific data gathered over large amounts of time and at great expense.

A typical computer network includes one or more computers connected to one or more storage devices, such as disk drives or tape drives, by one or more storage controllers. One technique for providing higher data availability in computer networks is to include redundant components in the network. Providing redundant components means providing two or more of the components such that if one of the components fails, one of the other redundant components continues to perform the function of the failed component. In many cases, the failed component can be quickly replaced to restore the system to its original data availability level.

A popular example of providing redundant components in a system is the notion of a redundant array of inexpensive disks (RAID). With a RAID, data is written to the plurality of disk drives in such a manner that if one of the disk drives fails, the data may be recovered from the remaining disk drives. In the simplest RAID configuration, commonly referred to as RAID level 1, all data is written to two disk drives which are maintained as a mirrored pair. If one of the mirrored drives fails, the desired data may be read from the remaining disk in the mirrored pair.

Another example of providing redundancy is within a storage controller in a computer network. High performance storage controllers typically include relatively large memories for buffering data transferred between the host computers and the storage devices. In particular, when a host computer writes data to a storage device via the storage controller, the storage controller receives the data from the host computer, writes the data into the storage controller memory, and informs the host computer that the data has been successfully transferred. Subsequently, the storage controller writes the data from its memory into the storage device. Buffering the data in this manner provides at least two advantages. First, the buffering serves to alleviate bottlenecks that might arise from transfer speed mismatches between the host/storage controller interface and the storage controller/storage device interface. Second, the buffered data may be cached, such that when a host subsequently reads the data, the storage controller can simply provide the data from its cache memory rather than having to first read the data from the storage device.

A potential problem with the buffered data approach described above is that if the storage controller memory fails, the data is lost forever. To alleviate this problem, a conventional approach is to provide two or more redundant memory subsystems. In the conventional redundant storage controller memory approach, the data is received from the host and written to the first redundant memory subsystem, and subsequently copied by the first memory subsystem to the second memory subsystem. By this approach, if the first memory subsystem fails, the second memory subsystem continues operation and writes the data to the storage device.

Unfortunately, there appears to be a paradigm in mass storage design such that performance and data availability are two opposing goals. Redundancy seems to imply lower performance. In the redundant storage controller example above, the redundant write is lower performing than a non-redundant write in at least two ways. First, the initial write of the data and the copy of the data are serialized, which means the redundant write takes approximately twice as long to perform as a non-redundant write. Second, the redundant write consumes considerably more resource bandwidth than a non-redundant write. In particular, the fact that the first memory is both written and read by a redundant write consumes twice the memory bandwidth of a non-redundant write. Additionally, the copy of the data from the first to the second memory subsystem consumes additional bandwidth on the bus connecting the two memory subsystems.

Therefore what is needed is an apparatus and method for providing higher performance redundant writes to redundant memory subsystems in storage controllers.

SUMMARY

The present invention provides a bus bridge apparatus for improving redundant write performance in storage controllers by writing the data directly and concurrently to the memory subsystems rather than having the primary memory subsystem copy the data to the other memory subsystem. Accordingly, in attainment of the aforementioned object, it is a feature of the present invention to provide a broadcast bridge apparatus. The apparatus includes a first port that receives data transmitted on a first local bus and a second port, coupled to the first port, which receives the data from the first port and provides the data for retransmission on a second local bus to a first memory subsystem. The apparatus also includes a third port, coupled to the first port, which receives a copy of the data from the first port and selectively provides the copy of the data for retransmission on a third local bus to a second memory subsystem.

In another aspect, it is a feature of the present invention to provide a bus bridge apparatus for broadcasting data from a first local bus on one side of the bridge to a plurality of redundant storage controllers coupled to second and third local buses on an opposite side of the bridge to relieve the redundant controllers from copying the data to one another. The apparatus includes a first FIFO memory, coupled to receive data from the first local bus. The data is associated with a first write transaction on the first local bus. The apparatus also includes first master logic, coupled to the first FIFO memory, which causes a second write transaction on the second local bus to transfer the data from the first FIFO memory to a first of the plurality of redundant storage controllers. The apparatus also includes a second FIFO memory, coupled to receive the data from the first local bus. The apparatus also includes second master logic, coupled to the second FIFO memory, which causes a third write transaction on the third local bus to transfer the data from the second FIFO memory to a second of the plurality of redundant storage controllers.

In another aspect, it is a feature of the present invention to provide a PCI-X bus bridge for bridging a first PCI-X bus to second and third PCI-X buses. The bus bridge includes first, second, and third PCI-X interfaces, coupled to the first, second, and third PCI-X buses, respectively. The first PCI-X interface is configured to receive a plurality of write transactions from the first PCI-X bus. The bus bridge also includes a plurality of broadcast bridge circuits, coupling the first PCI-X interface to the second and third PCI-X interfaces, each for causing both of the second and third PCI-X interfaces to retransmit a respective one of the plurality of write transactions on the second and third PCI-X buses, respectively.

In another aspect, it is a feature of the present invention to provide a PCI-X bus bridge. The bus bridge includes a PCI-X target circuit that receives a PCI-X write command from a first PCI-X bus coupled to one side of the bus bridge. The PCI-X write command specifies an address of data to be written. The bus bridge also includes a control input to the PCI-X target circuit that indicates whether the address is within an address range of an address space of the first PCI-X bus. The bus bridge also includes a write FIFO, coupled to the PCI-X target circuit, which receives the data for retransmission on a second PCI-X bus coupled to a side of the bus bridge opposite the first PCI-X bus. The bus bridge also includes a broadcast FIFO, coupled to the PCI-X target circuit, which receives a copy of the data for retransmission on a third PCI-X bus coupled to the opposite side of the bus bridge. The broadcast FIFO receives the copy of the data only if the address is within the address range.

In another aspect, it is a feature of the present invention to provide a method for selectively performing a data transfer across a bus bridge to a plurality of memory subsystems in a storage controller. The method includes receiving data on a first bus on one side of the bus bridge, writing the data to a first of the plurality of memory subsystems on a second bus on an opposite side of the bus bridge from the first bus, and determining whether the bus bridge is enabled to perform broadcast data transfers. The method also includes writing a copy of the data to a second of the plurality of memory subsystems on a third bus on the opposite side of the bus bridge only if the bus bridge is enabled to perform broadcast data transfers. The bus bridge writes the copy of the data to the second of the plurality of memory subsystems on the third bus substantially concurrently with the writing of the data to the first of the plurality of memory subsystems on the second bus.

In another aspect, it is a feature of the present invention to provide a redundant network storage controller. The controller includes at least one I/O interface circuit that receives data from a host computer and writes the data to one or more storage devices. The controller also includes a primary memory subsystem that buffers the data before being written to the storage devices. The controller also includes a secondary memory subsystem that stores a redundant copy of the data. The controller also includes a plurality of bus bridges that bridge a bus coupled to the at least one I/O interface circuit with a plurality of buses coupled to the primary and secondary memory subsystems. The plurality of bus bridges write the data received on the bus concurrently to the primary and secondary memory subsystems on first and second of the plurality of buses, respectively.

An advantage of the present invention is that it avoids the need for a memory subsystem to copy received data to its mirrored memory subsystem, which has several benefits. First, the actual data transfer time is reduced since the two writes to the two memory subsystems are performed concurrently rather than sequentially. Second, less local bus bandwidth is consumed since the present invention performs one less local bus write transaction than the conventional method. Third, the fact that the memory subsystem processor does not have to issue a copy of the data reduces the command overhead time associated with a mirrored write, thereby freeing up memory subsystem processor bandwidth. Finally, software development time may be reduced since the write of the data copy is performed in hardware rather than in software.

Other features and advantages of the present invention will become apparent upon study of the remaining portions of the specification and drawings.

DETAILED DESCRIPTION

Figure 1:
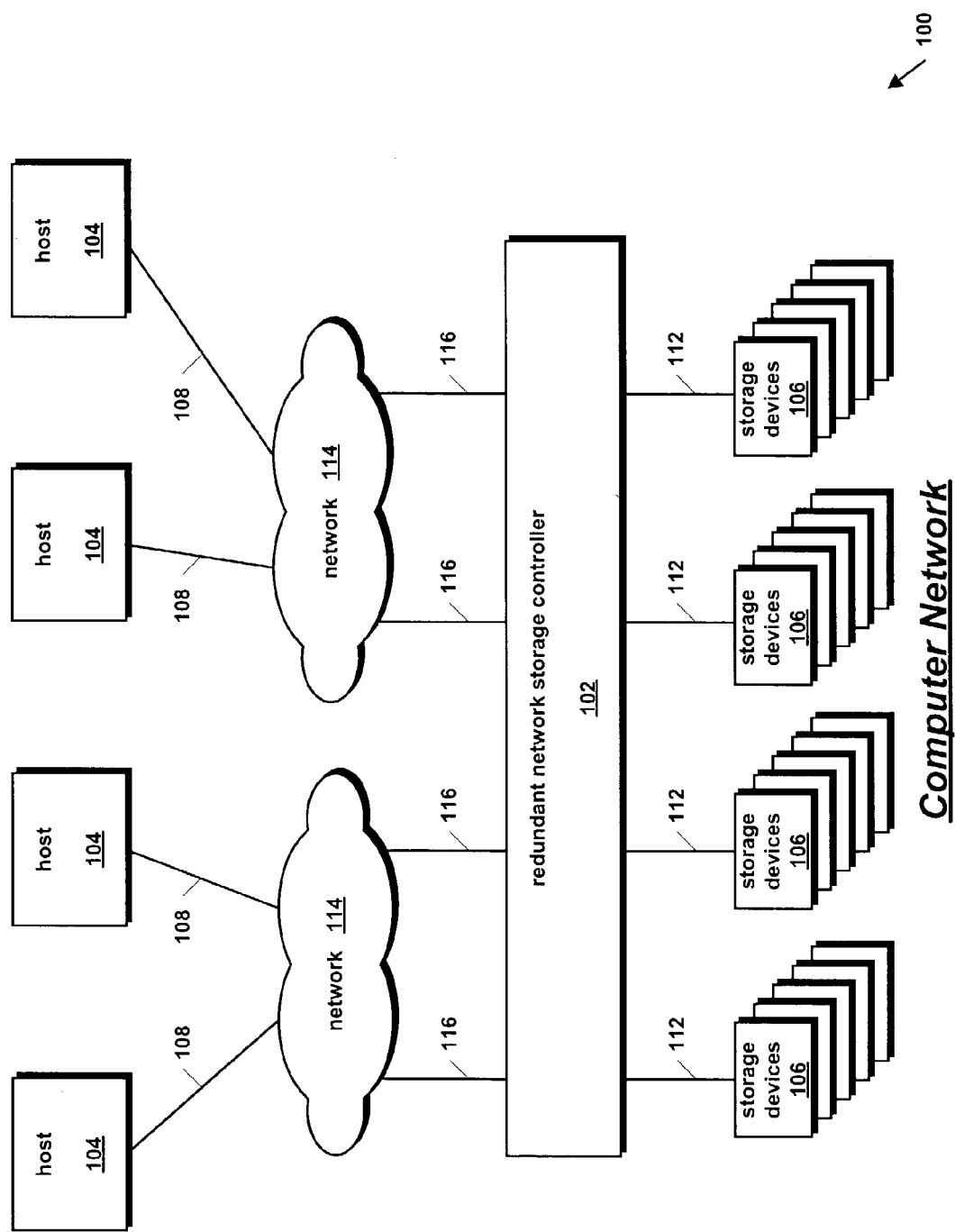
FIG. 1 is a block diagram of a computer network, including a redundant network storage controller according to the present invention.

Referring now to FIG. 1, a block diagram of a computer network 100 including a redundant network storage controller 102 according to the present invention is shown. The computer network 100 comprises a plurality of host computers 104 coupled to a plurality of storage devices 106 through networks 114 and a redundant network storage controller 102. The hosts 104 may be any type of computer, such as a file server, print server, enterprise server, or workstation. The storage devices 106 may be any type of storage devices, such as disk drives, tape drives, or writeable CDROM drives.

In one embodiment, computer network 100 comprises a storage area network (SAN), such as a Fibre Channel (FC) or Infiniband (IB) storage area network (SAN). In another embodiment, computer network 100 comprises a computer network with network attached storage (NAS). The networks 114 comprise any of various network types, including a FC network, an Infiniband network, an Ethernet network, a Token Ring network, an Arcnet network, an FDDI network, an LocalTalk network, an ATM network, etc. The interfaces 108 between hosts 104 and networks 114 and the interfaces 116 between networks 114 and redundant network storage controller 102 may be any one of various interfaces, such as a Fibre Channel, Ethernet, Infiniband (IB), Token Ring, Arcnet, FDDI, LocalTalk, or ATM. The interfaces 112 between redundant network storage controller 102 and storage devices 106 may be any one of various interfaces, such as a Fibre Channel, Ethernet, advanced technology attachment (ATA), serial ATA (SATA), small computer systems interface (SCSI), or Infiniband interface. In one embodiment, hosts 104 are coupled directly to redundant network storage controller 102 rather than indirectly through networks 114.

The redundant network storage controller 102 includes redundant components for increased data availability. In particular, when the hosts 104 write data to the redundant network storage controller 102, the redundant network storage controller 102 writes the data into a plurality of redundant memory subsystems so that if one of the memory subsystems fails, the other memory subsystem can write the data to the destination storage devices 106. Advantageously, as described below, the redundant network storage controller 102 writes the data to the plurality of redundant memory subsystems simultaneously, rather than writing the data to a first of the memory subsystems and then having the first memory subsystem copy the data to the second memory subsystem, and to other redundant memory subsystems, if present.

Figure 2:
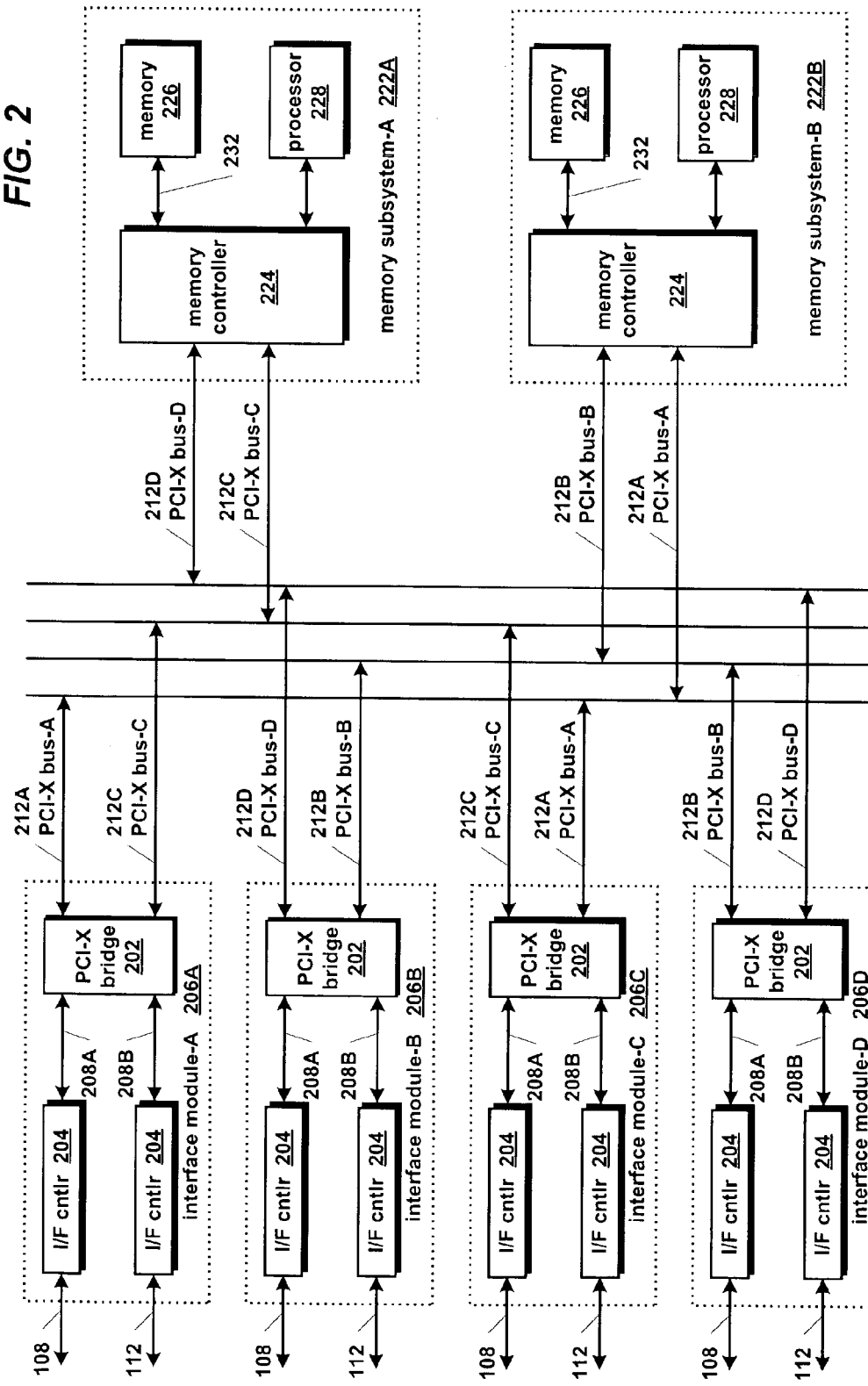
FIG. 2 is a block diagram of the redundant network storage controller of FIG. 1 according to the present invention.

Referring now to FIG. 2, a block diagram of the redundant network storage controller 102 of FIG. 1 according to the present invention is shown. In the embodiment of FIG. 2, redundant network storage controller 102 includes four interface modules 206 coupled to two redundant memory subsystems 222 by four PCI-X buses 212. In one embodiment, the PCI-X buses and devices described herein conform substantially to the PCI-X 1.0 specification. The four interface modules 206 are referred to individually as inter-face module-A 206A, interface module-B 206B, interface module-C 206C, and interface module-D 206D. The two memory subsystems 222 are referred to individually as memory subsystem-A 222A and memory subsystem-B 222B. The PCI-X buses 212 are referred to individually as PCI-X bus-A 212A, PCI-X bus-B 212B, PCI-X bus-C 212C, and PCI-X bus-D 212D. Memory subsystem-A 222A is coupled to PCI-X bus-D 212D and PCI-X bus-C 212C. Memory subsystem-B 222B is coupled to PCI-X bus-B 212B and PCI-X bus-A 212A. In one embodiment, the memory subsystems 222 provide arbitration for PCI-X buses 212.

Each of the interface modules 206 includes two interface controllers 204 and a four-ported PCI-X bus bridge 202. One of the interface controllers 204, also referred to as I/O interface circuits 204, is coupled to one of the PCI-X bridge 202 ports via a first PCI-X bus 208A and the other interface controller 204 is coupled to another one of the PCI-X bridge 202 ports via a second PCI-X bus 208B. In one embodiment, the interface controllers 204 are dual-ported Fibre Channel (FC) to PCI-X controllers. That is, each interface controller 204 includes two FC ports for coupling the redundant network storage controller 102 to hosts 104 and/or storage devices 106 via interfaces 108 and/or 112 of FIG. 1. In one embodiment, PCI-X bridge 202 provides arbitration for PCI-X buses 208. Interface controllers 204 perform FC protocol to PCI-X protocol conversion. Interface controllers 204 receive FC frames on their FC ports and responsively initiate PCI-X commands via their PCI-X ports on PCI-X buses 208 targeted at the memory subsystems 222. Conversely, interface controllers 204 are the target of PCI-X commands from PCI-X bus 208 initiated by the memory controllers 222 and retransmitted by PCI-X bridge 202; the interface controllers 204 transmit FC frames on interfaces 108 and/or 112 to hosts 104 and/or storage devices 106 in response to the PCI-X commands. In particular, interface controllers 204 receive FC frames with write data destined for the memory subsystems 222 and initiate PCI-X burst write commands, such as memory write or memory write block commands, on their PCI-X ports to the PCI-X bridge 202 for retransmission to each of the memory subsystems 222 in a broadcasted, or mirrored, fashion, as discussed below.

Each PCI-X bridge 202 includes four PCI-X ports for coupling to four PCI-X buses. Two of the PCI-X bridge 202 ports are coupled to the PCI-X port of the two interface controllers 204 via PCI-X buses 208A and 208B. The other two PCI-X bridge 202 ports are coupled to two of the four PCI-X buses 212. In the embodiment shown in FIG. 2, the PCI-X bridge 202 of interface module-A 206A is coupled to PCI-X bus-A 212A and PCI-X bus-C 212C; the PCI-X bridge 202 of interface module-B 206B is coupled to PCI-X bus-D 212D and PCI-X bus-B 212B; the PCI-X bridge 202 of interface module-C 206C is coupled to PCI-X bus-C 212C and PCI-X bus-A 212A; and the PCI-X bridge 202 of interface module-D 206D is coupled to PCI-X bus-B 212B and PCI-X bus-D 212D. Hence, each of the PCI-X bridges 202 is coupled to each of the memory subsystems 222. The PCI-X bridges 202 act as the target of PCI-X commands on PCI-X buses 208 and retransmit the commands as initiators on PCI-X buses 212; conversely, the PCI-X bridges 202 act as the target of PCI-X commands on PCI-X buses 212 and retransmit the commands as initiators on PCI-X buses 208, thereby enabling communication between the interface controllers 204 and the memory subsystems 222. In particular, a PCI-X bridge 202 receives a PCI-X burst write command on one of its PCI-X buses 208 on one side of the PCI-X bridge 202 and selectively broadcasts the write data on both of its PCI-X buses 212 on the other side of the PCI-X bridge 202 to each of the redundant memory subsystems 222, as discussed below.

The memory subsystems 222 each include a memory controller 224 coupled to a memory 226 and a microprocessor 228. The memory controller 224 includes two PCI-X bus ports for interfacing with two of the PCI-X buses 212. The memory controller 224 enables the transfer of data between the two PCI-X buses 212 and the memory 226. The memory controller 224 also provides the processor 228 access to the memory 226. In one embodiment, the memory 226 is double-data-rate (DDR) SDRAM memory. In one embodiment, the microprocessor 228 performs storage device control functions, such as RAID functionality. For example, a memory subsystem 222 may receive a logical disk write command from a host 104 and receive the write command data into its memory 226. In response, the microprocessor 228 determines which sectors of which of the disk drives 106 are implicated by the disk write command and writes the data from the memory 226 to the appropriate disk 106 sectors by initiating PCI-X burst write commands to one or more interface modules 206. In one embodiment, memory subsystems 222 also provide out-of-band configuration and management interfaces for redundant network storage controller 102.

Figure 3:
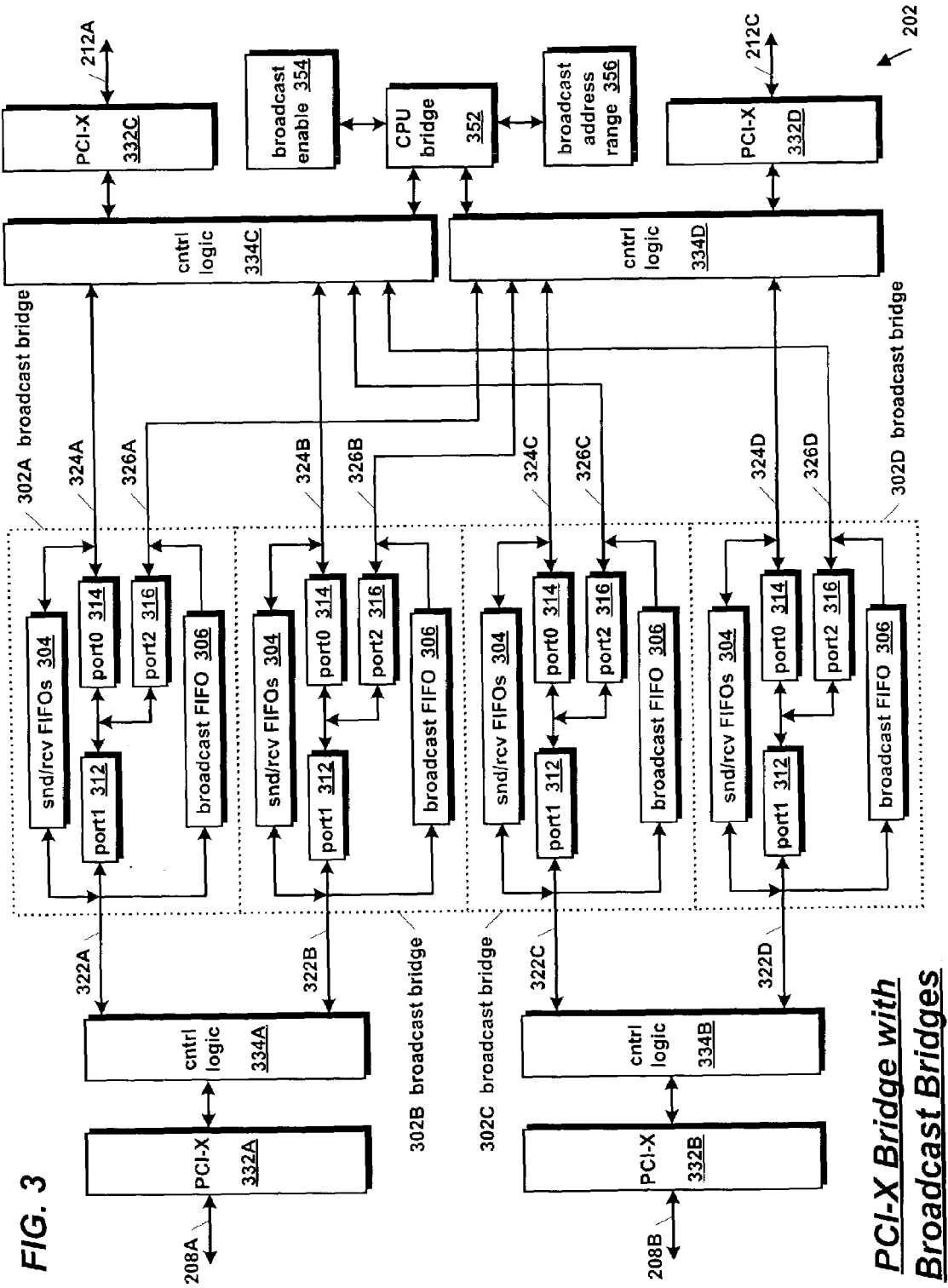
FIG. 3 is a block diagram of a PCI-X bridge controller of FIG. 2 according to the present invention.

Referring now to FIG. 3, a block diagram of a PCI-X bridge controller 202 of FIG. 2 according to the present invention is shown. PCI-X bridge 202 includes four PCI-X interfaces 332, or ports 332, (referred to individually as 332A, 332B, 332C, and 332D), four broadcast bridges 302 (referred to individually as 302A, 302B, 302C, and 302D), and four sets of control logic 334 (referred to individually as 334A, 334B, 334C, and 334D). Control logic 334 includes arbitration and multiplexing logic for selectively coupling the broadcast bridges 302 to the PCI-X interfaces 332 in predetermined combinations, as shown, and as described below. That is, control logic 334 performs arbitration and steers control and data signals of PCI-X buses 208/212 of FIG. 2 between the broadcast bridges 302 and the PCI-X interfaces 332, as shown, depending upon which of the broadcast bridges 302 is currently performing a PCI-X transaction on the associated PCI-X bus 208/212, as described below.

In particular, control logic 334A selectively couples PCI-X signals 322A from broadcast bridge 302A or PCI-X signals 322B from broadcast bridge 302B to PCI-X interface 332A; control logic 334B selectively couples PCI-X signals 322C from broadcast bridge 302C or PCI-X signals 322D from broadcast bridge 302D to PCI-X interface 332B; control logic 334C selectively couples PCI-X signals 324A from broadcast bridge 302A or PCI-X signals 324B from broadcast bridge 302B or PCI-X signals 326C from broadcast bridge 302C or PCI-X signals 326D from broadcast bridge 302D to PCI-X interface 332C; control logic 334D selectively couples PCI-X signals 326A from broadcast bridge 302A or PCI-X signals 326B from broadcast bridge 302B or PCI-X signals 324C from broadcast bridge 302C or PCI-X signals 324D from broadcast bridge 302D to PCI-X interface 332D. PCI-X signals 322A, 322B, 322C, or 322D are referred to generically as PCI-X signals 322; PCI-X signals 324A, 324B, 324C, or 324D are referred to generically as PCI-X signals 324; and PCI-X signals 326A, 326B, 326C, or 326D are referred to generically as PCI-X signals 326.

PCI-X interfaces 332A and 332B are on the interface module 206 side of PCI-X bridge 202 and are coupled to PCI-X buses 208A and 208B, respectively. PCI-X interfaces 332C and 332D are on the memory subsystem 222 side of PCI-X bridge 202 and are coupled to two of the PCI-X buses 212. FIG. 3 illustrates the PCI-X bridge 202 of interface module-A 206A, which is representative of the other PCI-X bridges 202 of FIG. 2. Because FIG. 3 illustrates the PCI-X bridge 202 of interface module-A 206A, PCI-X interfaces 332C and 332D are shown coupled to PCI-X buses 212A and 212C, respectively, to correspond with FIG. 2.

Figure 4:
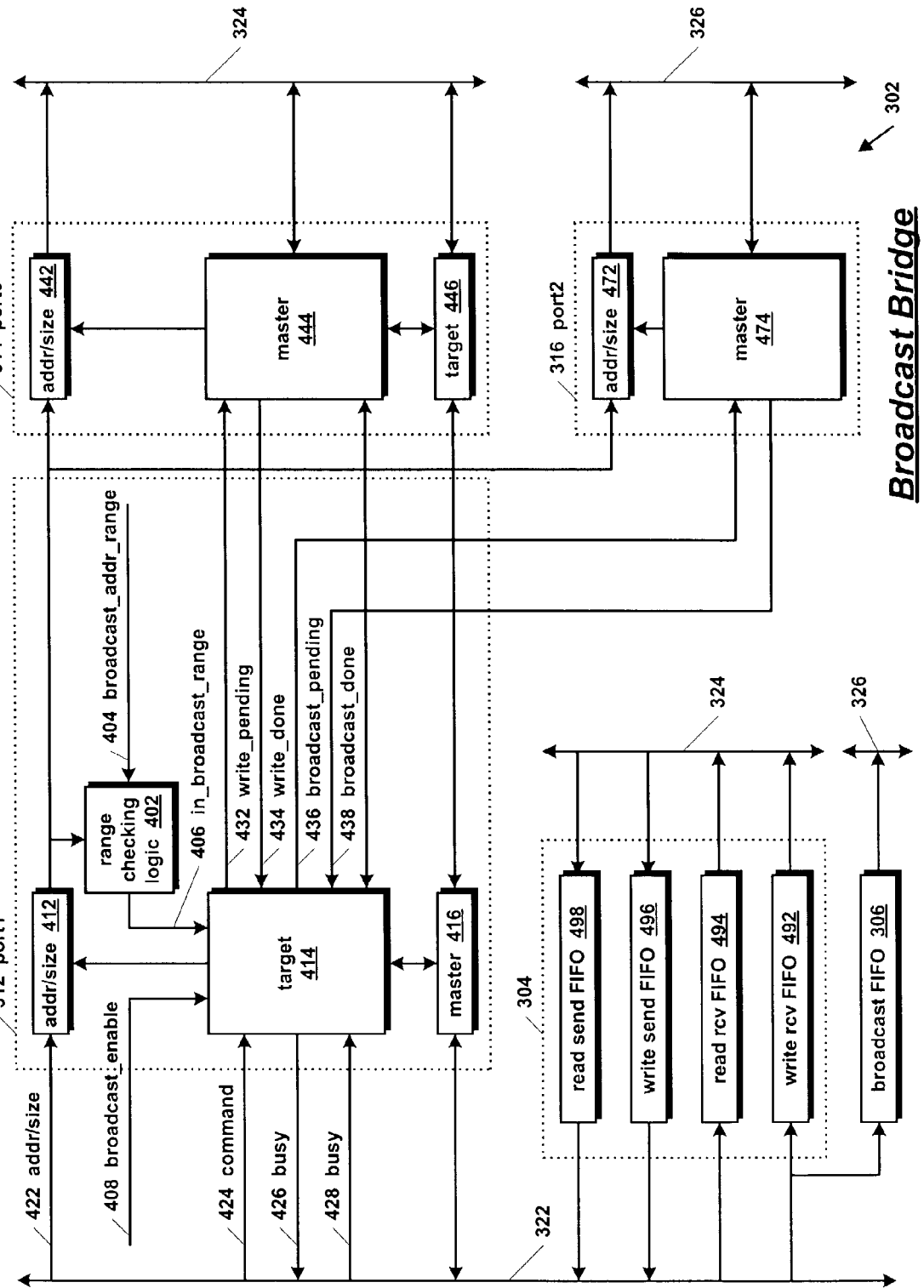
FIG. 4 is a block diagram of a broadcast bridge apparatus of FIG. 3 according to the present invention.

Each of the broadcast bridges 302 includes send/receive first-in-first-out (FIFO) memories 304, a broadcast FIFO memory 306, and three PCI-X ports, denoted port1 312, port0 314, and port2 316, all of which are described in more detail with respect to FIG. 4. The FIFO memories are also referred to as buffers. Port2 316 is capable of being a PCI-X bus master, and port1 312 and port0 314 are capable of being a PCI-X master and a PCI-X target. Port1 312, the inputs of receive FIFOs 304, the outputs of send FIFOs 304, and the input of broadcast FIFO 306 are all coupled to PCI-X signals 322. Port0 314, the outputs of receive FIFOs 304, and the inputs of send FIFOs 304 are all coupled to PCI-X signals 324. Port2 316 and the output of broadcast FIFO 306 are all coupled to PCI-X signals 326. Also, port1 312 is coupled to port0 314 and port2 316, as described below with respect to FIG. 4.

PCI-X bridge 202 also includes a CPU bridge 352 coupled to control logic 334C and 334D. CPU bridge 352 is a communication path between the two memory subsystems 222 of FIG. 2, and in particular for facilitating communication between the memory subsystem 222 processors 228 of FIG. 2 via PCI-X memory commands. In one embodiment, CPU bridge 352 provides address translation between the two memory subsystems 222, so that a desired PCI-X address range in one memory subsystem 222 may be mapped to a different PCI-X address range in the other memory subsystem 222. In one embodiment, the primary memory subsystem 222 of a mirrored write operation employs CPU bridge 352 to update tables in the secondary memory subsystem 222 that specify the presence and location of mirrored data in the secondary memory subsystem 222. Because the mirrored data is used by the secondary memory subsystem 222 only if the primary memory subsystem 222 fails, updating the tables via the CPU bridge 352 advantageously alleviates the need for the primary memory subsystem 222 to interrupt the secondary memory subsystem 222 on every transaction.

The PCI-X bridge 202 also includes a broadcast enable bit 354 contained in a control register coupled to CPU bridge 352. In one embodiment, PCI-X bridge 202 also includes a software-programmable broadcast address range register 356 coupled to CPU bridge 352. In one embodiment, the broadcast address range is predetermined, i.e., hardwired, into the PCI-X bridge 202 rather than being programmable in address range register 356. The broadcast enable bit 354 and broadcast address range are used to selectively enable/disable broadcast writes described herein.

Advantageously, broadcast, or mirrored, writes may be selectively enabled/disabled. Some application environments, such as video streaming, may prefer the higher performance afforded by two independent memory subsystems over the higher data availability of redundant memory subsystems and choose to disable broadcasted writes. In one embodiment, the memory subsystems 222 program the broadcast enable bit 354 based on whether host software configures the memory subsystems 222 as redundant or non-redundant.

Referring now to FIG. 4, a block diagram of a broadcast bridge apparatus 302 of FIG. 3 according to the present invention is shown. The broadcast bridge 302 is includes port1 312, port0 314, port2 316, broadcast FIFO 306, and send/receive FIFOs 304 coupled to PCI-X signals 322, 324, and 326 of FIG. 3. The FIFOs 304 and 306 are used to buffer PCI-X transaction data as it is transferred through PCI-X bridge 202 between the PCI-X buses 208 and 212. In one embodiment, each of the send/receive FIFOs 304 and the broadcast FIFO 306 are capable of storing and forwarding up to 4 KB of data, which is the maximum allowable PCI-X transfer size. In one embodiment, the FIFOs 304/306 include outputs that indicate how full or empty the FIFOs 304/306 are to enable the PCI-X interfaces 332 know when one or more blocks of data are present in the FIFOs 304/306 and to disconnect on block boundaries if necessary.

The send/receive FIFOs 304 include a write receive FIFO 492, a read receive FIFO 494, a write send FIFO 496, and a read send FIFO 498. The inputs to write receive FIFO 492 and read receive FIFO 494 are coupled to PCI-X signals 322 and their outputs are coupled to PCI-X signals 324. The inputs to write send FIFO 496 and read send FIFO 498 are coupled to PCI-X signals 324 and their outputs are coupled to PCI-X signals 322. The input to broadcast FIFO 306 is coupled to PCI-X signals 322 and its output is coupled to PCI-X signals 326.

The send FIFOs 496/498 are used to transfer data in the direction from port0 314 to port1 312, i.e., from a PCI-X bus 212 on the memory subsystem 222 side of PCI-X bridge 202 to a PCI-X bus 208 on the interface controller 204 side of PCI-X bridge 202. The receive FIFOs 492/494 are used to transfer data in the direction from port1 312 to port0 314, i.e., from a PCI-X bus 208 on the interface controller 204 side of PCI-X bridge 202 to a PCI-X bus 212 on the memory subsystem 222 side of PCI-X bridge 202. The broadcast FIFO 306 is used to transfer data in the direction from port1 312 to port2 316, i.e., from a PCI-X bus 208 on the interface controller 204 side of PCI-X bridge 202 to a PCI-X bus 212 on the memory subsystem 222 side of PCI-X bridge 202. In particular, when write data is being transferred through write receive FIFO 492 to a primary memory subsystem 222, advantageously broadcast FIFO 306 is selectively used to broadcast a mirrored copy of the write data to a secondary memory subsystem 222, as described below.

Port1 312 includes a PCI-X target circuit 414 coupled to an address/size register 412. PCI-X target 414 is configured to function as a target of PCI-X commands initiated by the interface controller 204 of FIG. 2, which is selectively coupled to port1 312 via control logic 334 and PCI-X interface 332 on PCI-X bus 208. PCI-X target 414 receives from PCI-X signals 322 a PCI-X command 424, such as a PCI-X burst write command, initiated by one of the interface controllers 204 on a PCI-X bus 208. A start byte address and byte transfer count 422 of the burst write command are stored in address/size register 412.

PCI-X target 414 generates a write_pending signal 432 provided to a PCI-X master circuit 444 in port0 314 to inform port0 314 that port1 312 has received a PCI-X burst write command and that associated write data is being stored into write receive FIFO 492. In response to the assertion of write_pending signal 432, port0 314 PCI-X master 444 loads the PCI-X burst write command address and count into an address/size register 442 of port0 314 from address/size register 412 of port1 312, and initiates a PCI-X burst write command on PCI-X signals 324 to perform a transfer of the write data from the write receive FIFO 492 to the primary memory subsystem 222 of FIG. 2, which is selectively coupled to port0 314 via control logic 334 and PCI-X interface 332 on PCI-X bus 212. Port0 314 PCI-X master 444 generates a write_done signal 434 to notify PCI-X target 414 that the PCI-X burst write command transferring the write data to the primary memory subsystem 222 has completed.

PCI-X target 414 also generates a broadcast_pending signal 436 provided to a PCI-X master circuit 474 in port2 316 to inform port2 316 that port1 312 has received a PCI-X burst write command and that a copy of associated write data is being stored into broadcast FIFO 306. However, PCI-X target 414 only asserts the broadcast_pending signal 436 if port1 312 determines that a broadcast, or mirrored, write is desired.

Port1 312 determines whether a broadcast write is desired by examining a broadcast_enable input 408 and an in_broadcast_range input 406. The broadcast_enable input 408 indicates the value of the broadcast enable bit 354 of FIG. 3. The in_broadcast_range input 406 is the output of range checking logic 402 comprised in port1 312. The range checking logic 402 receives the PCI-X burst write command start byte address in address/size register 412 and a broadcast_address_range signal 404. In one embodiment, the broadcast_address_range signal 404 indicates the value stored in broadcast address range register 356 of FIG. 3. In another embodiment, the value of the broadcast_address_range signal 404 is hardwired. The range checking logic 402 compares the start byte address from address/size register 412 with broadcast_address_range signal 404 and generates a true value on in_broadcast_range signal 406 if the start byte address from address/size register 412 is within the address range specified by broadcast_address_range signal 404; otherwise, range checking logic 402 generates a false value on in_broadcast_range signal 406.

In response to the assertion of broadcast_pending 436, port2 316 PCI-X master 474 loads the PCI-X write block command address and count into an address/size register 472 of port2 316 from address/size register 412 of port1 312, and initiates a PCI-X burst write command on PCI-X signals 326 to perform a transfer of the write data from the broadcast FIFO 306 to the secondary memory subsystem 222 of FIG. 2, which is selectively coupled to port2 316 via control logic 334 and PCI-X interface 332 on PCI-X bus 212. Port2 316 PCI-X master 474 generates a broadcast_done signal 438 to notify PCI-X target 414 that the PCI-X burst write command transferring the write data to the secondary memory subsystem 222 has completed.

PCI-X target 414 and PCI-X master 444 operate in a similar manner just described to perform PCI-X read commands initiated by an interface controller 204 coupled to port1 312 to transfer data across PCI-X bridge 202 from a memory subsystem 222 to an interface controller 204 via read send FIFO 498. However, the read command data transfer is not a broadcasted read.

Port1 312 also includes a PCI-X master circuit 416 coupled to PCI-X target 414 and PCI-X signals 322. Port0 314 also includes a PCI-X target circuit 446 coupled to PCI-X master 444 and PCI-X signals 324. PCI-X target 446 and PCI-X master 416 operate in a manner similar to target 414 and master 444 described above to perform PCI-X commands initiated by a memory subsystem 222 coupled to port0 314 to transfer data across PCI-X bridge 202 between a memory subsystem 222 and an interface controller 204 via write send FIFO 496 and read receive FIFO 494 in a non-broadcasted manner.

PCI-X target 414 also generates a busy output signal 426 to indicate whether it is currently busy servicing a PCI-X command initiated by an interface controller 204 on PCI-X bus 208. PCI-X target 414 also receives a busy input signal 428 to indicate whether the other paired broadcast bridge 302 is currently busy servicing a PCI-X command initiated by an interface controller 204 on PCI-X bus 208. Thus, for example, with reference to FIG. 3, the busy output 426 of port1 312 of broadcast bridge-A 302A is provided as the busy input 428 to port1 312 of broadcast bridge-B 302B.

In the embodiment of FIG. 3, the PCI-X bridge 202 includes two broadcast bridges 302 for each PCI-X bus pair 208/212, as shown, which accommodates overlapping PCI-X commands for increased performance over a single broadcast bridge 302 per PCI-X bus pair 208/212 configuration. However, more than two broadcast bridges 302 per PCI-X bus pair 208/212 may be employed in PCI-X bridge 202 depending upon the demands of the application employing the PCI-X bridge 202. In one embodiment, each of the broadcast bridges 302 coupled to a PCI-X interface 332 sees the beginning of a PCI-X command initiated on PCI-X bus 208/212 via control logic 334, and the non-busy broadcast bridges 302 (i.e., those not asserting their busy output 426) respond to the PCI-X command in a round-robin fashion. The control logic 334 couples to the PCI-X interface 332 the PCI-X signals 322 coupled to the non-busy broadcast bridge 302 that is selected to service the PCI-X command.

In one embodiment, port0 314, port1 312, and port2 316 operate according to different clock sources since each of the four PCI-X interfaces 332 of FIG. 3 operate based on independent clock sources. Therefore, synchronization logic is provided to synchronize the signals that communicate between port0 314, port1 312, and port2 316, such as write_pending signal 432, write_done signal 434, broadcast_pending signal 436, and broadcast_done signal 438.

Figure 5:
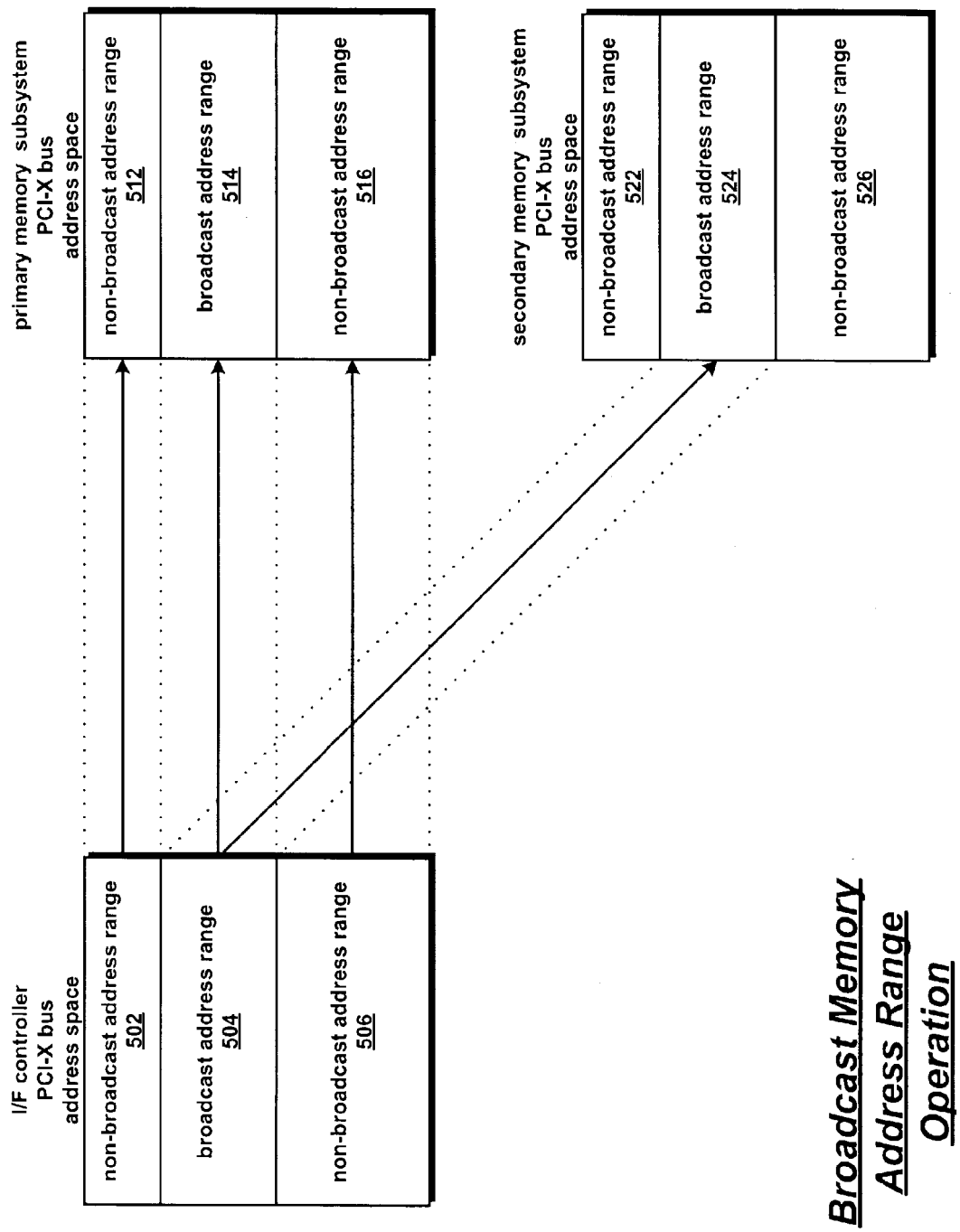
FIG. 5 is a block diagram illustrating selective broadcast, or mirrored, writes to the redundant memory subsystems of FIG. 2 based on a broadcast memory range according to the present invention.

Referring now to FIG. 5, a block diagram illustrating selective broadcast, or mirrored, writes to the redundant memory subsystems 222 of FIG. 2 based on a broadcast memory range according to the present invention is shown. FIG. 5 shows an address space of one of the PCI-X buses 208 of FIG. 2 to which one of the interface controllers 204 of FIG. 2 is attached. The address space is divided into three ranges: a first non-broadcast address range 502, a broadcast address range 504, and a second non-broadcast range 506. The broadcast address range 504 is stored in, i.e., known to, the PCI-X bridge 202 of FIG. 2 and indicated on broadcast_address_range signal 404 of FIG. 4. In one embodiment, the broadcast address range 504 is stored in the PCI-X bridge 202 because the broadcast address range 504 is hard-coded into the PCI-X bridge 202. In another embodiment, the broadcast address range 504 is stored in the PCI-X bridge 202 because the PCI-X bridge 202 includes broadcast address range register 356 of FIG. 3, which specifies the broadcast address range 504. In one embodiment, broadcast address range register 356 is programmable by software. The first and second non-broadcast address ranges 502 and 506, respectively, represent the remainder of the address space of the PCI-X bus 208.

FIG. 5 also shows an address space of the PCI-X bus 212 of FIG. 2 to which one of the memory subsystems 222 of FIG. 2 is attached, which will be referred to as the primary memory subsystem 222. The primary memory subsystem 222 address space is also divided into three ranges: a first non-broadcast address range 512 corresponding to first non-broadcast address range 502, a broadcast address range 514 corresponding to broadcast address range 504, and a second non-broadcast range 516 corresponding to second non-broadcast range 506.

FIG. 5 also shows an address space of the PCI-X bus 212 of FIG. 2 to which the other of the memory subsystems 222 of FIG. 2 is attached, which will be referred to as the secondary memory subsystem 222. The secondary memory subsystem 222 address space is also divided into three ranges: a first non-broadcast address range 522 corresponding to first non-broadcast address range 502, a broadcast address range 524 corresponding to broadcast address range 504, and a second non-broadcast range 526 corresponding to second non-broadcast range 506.

As shown in FIG. 5, write requests on the interface controller 204 side PCI-X bus 208 having an address in broadcast address range 504 are retransmitted by PCI-X bridge 202 to the corresponding address in both the primary broadcast address range 514 and the secondary broadcast address range 524 assuming the broadcast enable bit 354 is set. However, write requests on the interface controller 204 side PCI-X bus 208 having an address in one of the non-broadcast address ranges 502/506 are retransmitted by PCI-X bridge 202 only to the corresponding address in the primary broadcast address range 512/516.

In one embodiment, multiple broadcast address ranges may be used, rather than a single broadcast address range. If the PCI-X burst write command start byte address falls within any of the multiple broadcast address ranges, the PCI-X bridge 202 performs a broadcast write.

Figure 6:
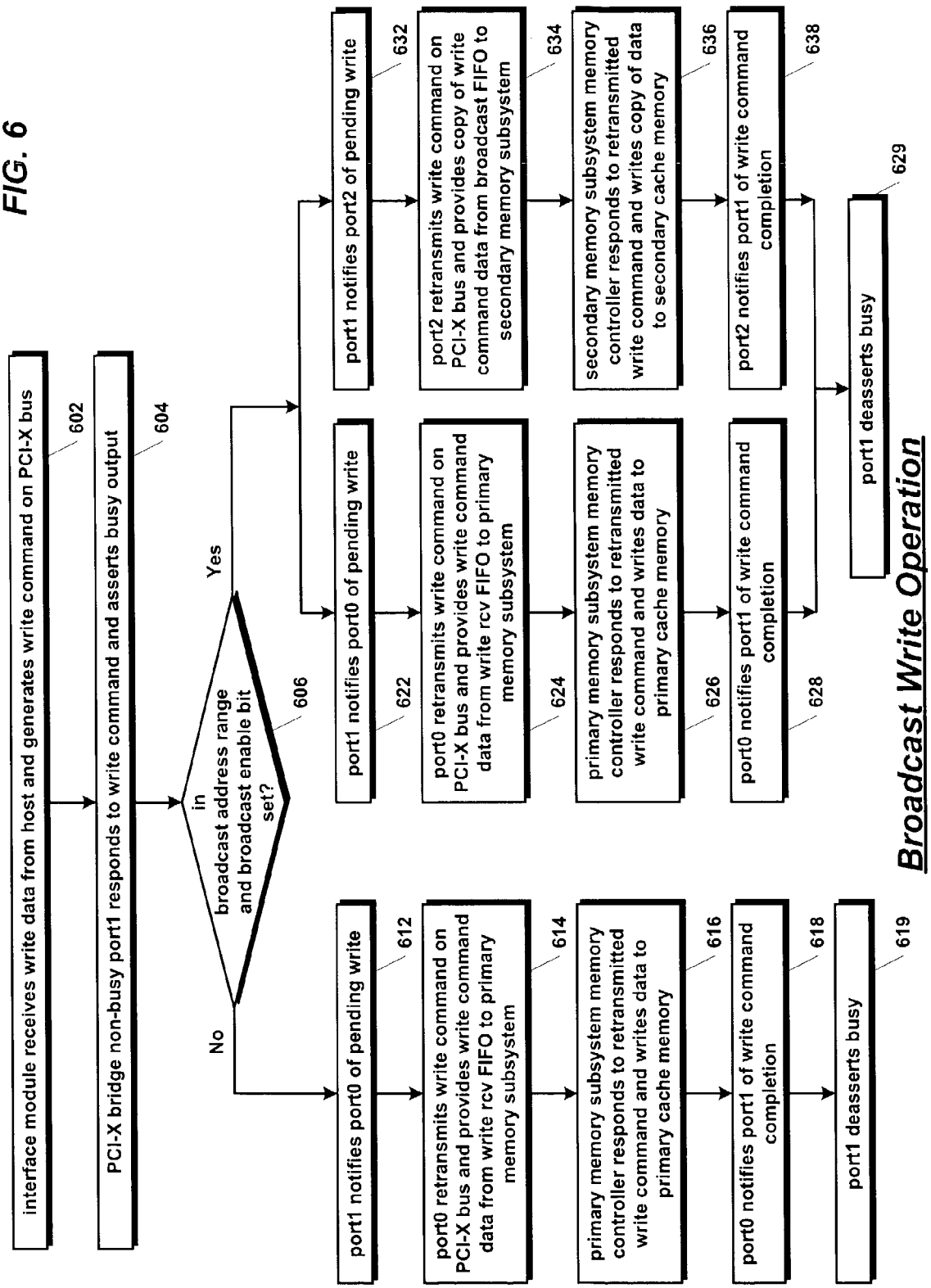
FIG. 6 is a flowchart illustrating operation of the redundant network storage controller of FIG. 2 according to the present invention.

Referring now to FIG. 6, a flowchart illustrating operation of the redundant network storage controller 102 of FIG. 2 according to the present invention is shown. Flow begins at block 602.

At block 602, one of the interface modules 206 of FIG. 2 receives write data from a host 104 of FIG. 1. For example, the interface module 206 may receive a Fibre Channel frame containing the write data. In response, the interface controller 204 of FIG. 2 receiving the write data generates a PCI-X burst write command, such as a PCI-X memory write block command, on the PCI-X bus 208 of FIG. 2 coupled to the interface controller 204. Flow proceeds to block 604.

At block 604, the PCI-X write command generated at block 602 is conveyed to port1 312 of each of the two broadcast bridges 302 of FIG. 3, which are coupled to the PCI-X bus 208 via PCI-X interface 332 and control logic 334 of FIG. 3. One of the broadcast bridges 302 that is not busy (as determined by busy inputs 428) according to the round-robin scheme responds to the PCI-X write command and asserts its busy output 426 of FIG. 4. Consequently, control logic 334 uncouples the non-responding broadcast bridge 302 from PCI-X signals 332 and continues coupling the responding broadcast bridge 202 to PCI-X signals 322. Flow proceeds to decision block 606.

At block 606, port1 312 determines whether the address of the PCI-X write command is in the broadcast address range stored in the PCI-X bridge 202 (such as in broadcast address range register 356 in one embodiment), and whether the broadcast enable bit 354 is set. That is, port1 312 determines whether both of the broadcast_enable 408 and in_broadcast_range 406 signals are true. If not, flow proceeds to block 612 to perform a non-broadcast, or non-mirrored, write. Otherwise, flow proceeds in parallel to one flow beginning at block 622 and another flow beginning at block 632 to perform a broadcast, or mirrored, write.

At block 612, port1 312 notifies port0 314 of FIG. 4 of the pending PCI-X write command via write_pending signal 432. That is, port1 312 notifies port0 314 that write data is being written into write receive FIFO 492 and provides the write command address and count to address/size register 442. Flow proceeds to block 614.

At block 614, port0 314 retransmits the PCI-X write command to the primary memory subsystem 222 on PCI-X bus 212 via PCI-X signals 324, which are selectively coupled to PCI-X bus 212 via control logic 334 and PCI-X interface 332. Retransmitting the PCI-X write command includes providing the write data from write receive FIFO 492 to the primary memory subsystem 222 via PCI-X bus 212. Flow proceeds to block 616.

At block 616, the memory controller 224 of the primary memory subsystem 222 receives the retransmitted PCI-X burst write command, including the write data from the write receive FIFO 492, and writes the data into its memory 226. Flow proceeds to block 618.

At block 618, port0 314 notifies port1 312 that the write data has been transmitted to the primary memory subsystem 222, i.e., that the PCI-X write command has completed. Flow proceeds to block 619.

At block 619, port1 312 deasserts its busy output signal 426 in response to the write command completion. Flow ends at block 619.

Blocks 622 through 628 are essentially the same as blocks 612 through 618. However, blocks 622 through 628 are part of a mirrored write due to the operations performed in blocks 632 through 638, as described below.

At block 622, port1 312 notifies port0 314 of the pending PCI-X write command via write_pending signal 432. That is, port1 312 notifies port0 314 that write data is being written into write receive FIFO 492 and provides the write command address and count to address/size register 442. Flow proceeds to block 624.

At block 624, port0 314 retransmits the PCI-X write command to the primary memory subsystem 222 on PCI-X bus 212 via PCI-X signals 324, which are selectively coupled to PCI-X bus 212 via control logic 334 and PCI-X interface 332. Retransmitting the PCI-X write command includes providing the write data from write receive FIFO 492 to the primary memory subsystem 222 via PCI-X bus 212. Flow proceeds to block 626.

At block 626, the memory controller 224 of the primary memory subsystem 222 receives the retransmitted PCI-X burst write command, including the write data from the write receive FIFO 492, and writes the data into its memory 226. Flow proceeds to block 628.

At block 628, port0 314 notifies port1 312 that the write data has been transmitted to the primary memory subsystem 222, i.e., that the PCI-X write command has completed. Flow proceeds to block 629.

At block 632, port1 312 notifies port2 316 of FIG. 4 of the pending PCI-X write command via broadcast_pending signal 436. That is, port1 312 notifies port2 316 that write data is being written into broadcast FIFO 306 and provides the write command address and count to address/size register 472. Flow proceeds to block 634.

At block 634, port2 316 retransmits the PCI-X write command to the secondary memory subsystem 222 on PCI-X bus 212 via PCI-X signals 326, which are selectively coupled to PCI-X bus 212 via control logic 334 and PCI-X interface 332. Retransmitting the PCI-X write command includes providing a copy of the write data from broadcast FIFO 306 to the secondary memory subsystem 222 via PCI-X bus 212. Flow proceeds to block 636.

At block 636, the memory controller 224 of the secondary memory subsystem 222 receives the retransmitted PCI-X burst write command, including the copy of the write data from the broadcast FIFO 306, and writes the data into its memory 226. Flow proceeds to block 638.

At block 638, port2 316 notifies port1 312 that the write data has been transmitted to the secondary memory subsystem 222, i.e., that the PCI-X write command has completed. Flow proceeds to block 629.

At block 629, port1 312 has been notified by each of port0 314 and port2 316 that their respective PCI-X write commands to the primary and secondary memory subsystem 222, respectively, have completed, and responsively deasserts its busy output 426. Now the broadcast bridge 302 is ready to receive data associated with another PCI-X write command into its write receive FIFO 492 and its broadcast FIFO 306. Flow ends at block 629.

Figure 7:
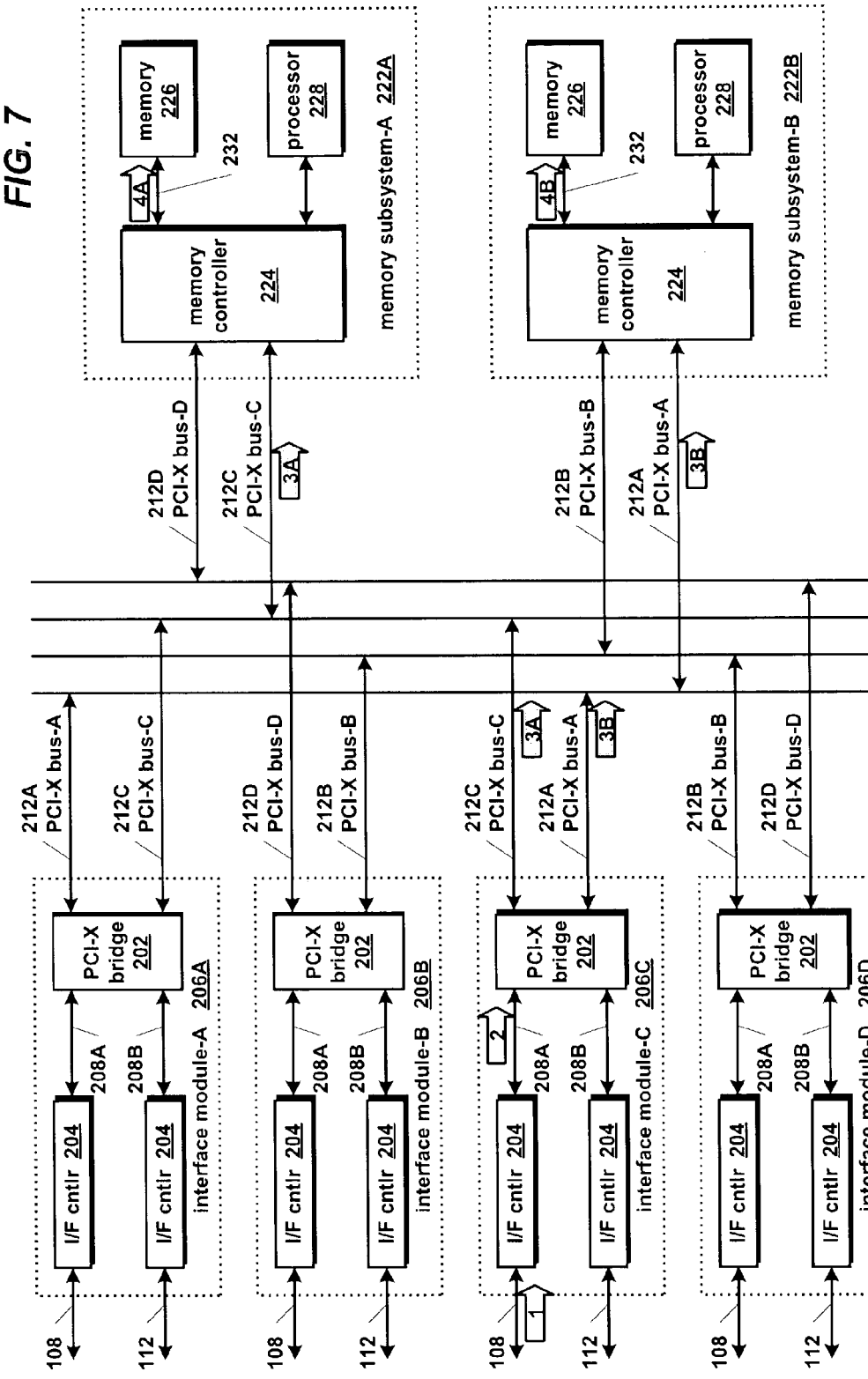
FIG. 7 is a block diagram of the redundant network storage controller of FIG. 2 illustrating data flow in a broadcast write example according to the present invention.

Referring now to FIG. 7, a block diagram of the redundant network storage controller 102 of FIG. 2 illustrating data flow in a broadcast write example according to the present invention is shown. In the example of FIG. 7, memory subsystem-A 222A is the primary memory subsystem and memory subsystem-B 222B is the secondary memory subsystem of a broadcast write. The flow of data through redundant network storage controller 102 is indicated in FIG. 7 by thick shaded arrows with numbers contained therein. The direction of the arrows shows the direction of data flow. The sequence of the numbers inside the arrows specifies the sequence of data flowing through the redundant network storage controller 102.

A host 104 of FIG. 1 transmits write data to redundant network storage controller 102 of FIG. 7. The write data is received by the interface controller 204 coupled to interface 108, according to block 602 of FIG. 6, as shown by arrow 1. The interface controller 204 generates a PCI-X burst write command on PCI-X bus 208A in response to reception of the host write data, according to block 602, as shown by arrow 2. PCI-X bridge 202 receives the PCI-X write command, according to block 604 of FIG. 6.

In response to the PCI-X write command, PCI-X bridge 202 determines that the write command address is within the broadcast address range and that broadcast enable bit is set, according to block 606 of FIG. 6. Consequently, PCI-X bridge 202 transmits the write data to the primary memory subsystem-A 222A on PCI-X bus 212C, according to blocks 622 and 624 of FIG. 6, as shown by arrow 3A. Concurrently, PCI-X bridge 202 transmits a copy of the write data to the secondary memory subsystem-B 222B on PCI-X bus 212A, according to blocks 632 and 634 of FIG. 6, as shown by arrow 3B.

The primary memory subsystem-A 222A receives the data and writes the data into its cache memory 226, according to block 626 of FIG. 6, as shown by arrow 4A. Concurrently, secondary memory subsystem-B 222B receives the copy of the data and writes the data into its cache memory 226, according to block 636 of FIG. 6, as shown by arrow 4B.

Figure 8:
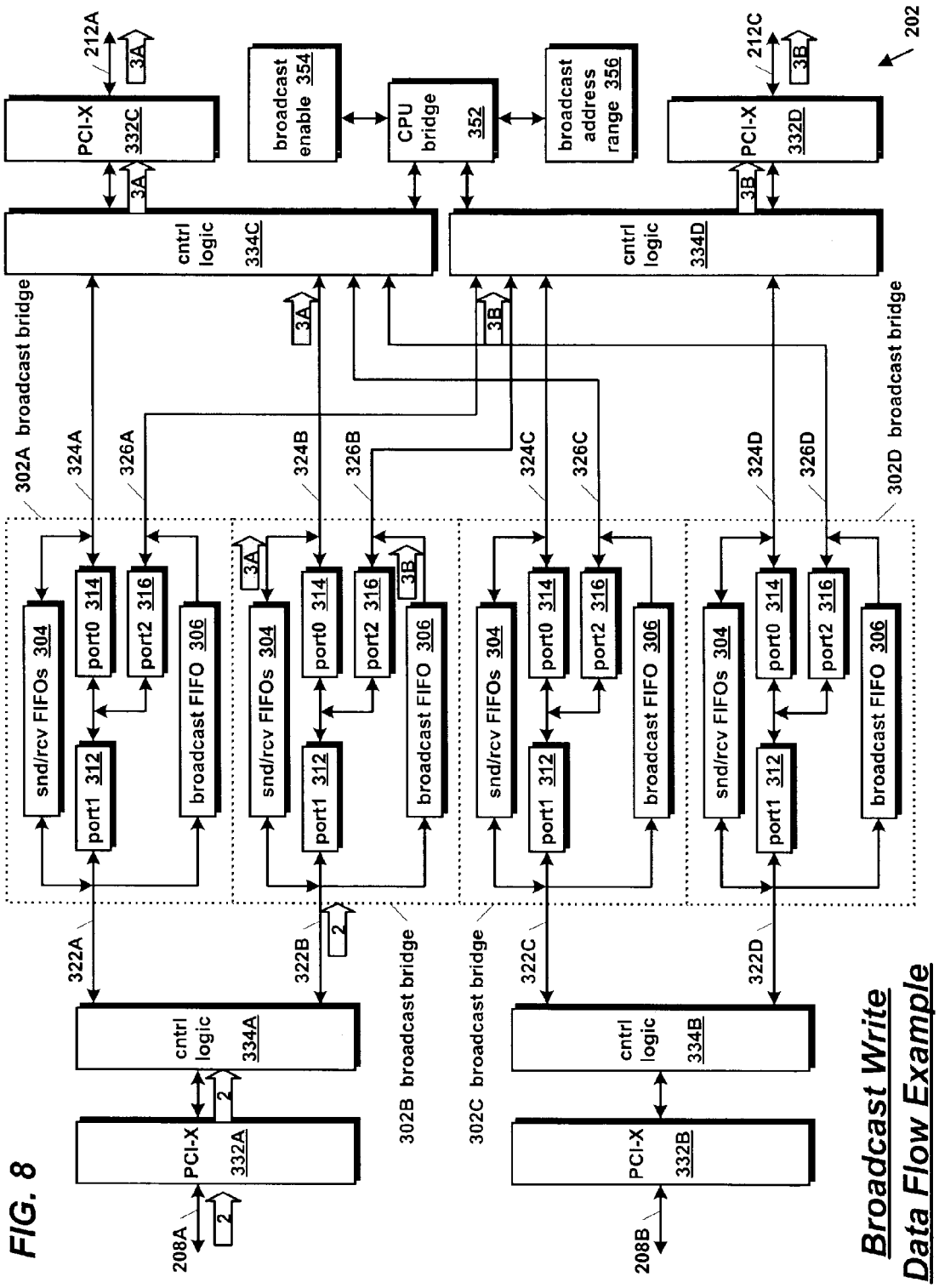
FIG. 8 is a block diagram of the PCI-X bridge of FIG. 3 illustrating data flow in the broadcast write example of FIG. 7 according to the present invention.

Referring now to FIG. 8, a block diagram of the PCI-X bridge 202 of FIG. 3 illustrating data flow in the broadcast write example of FIG. 7 according to the present invention is shown. In the example of FIG. 8, the flow of data through PCI-X bridge 202 is indicated by thick shaded arrows denoted 2, 3A, and 3B, corresponding to the data flow example arrows of FIG. 7.

PCI-X interface 332A of FIG. 8 receives the PCI-X write command on PCI-X bus 208A from interface controller 204 of FIG. 7 and conveys the command to control logic 334A, as shown by arrow 2. In the example, broadcast bridge 302B is the next non-busy broadcast bridge 302 in the round-robin scheme; therefore, control logic 334A selectively couples PCI-X signals 322B to PCI-X interface 332A since port1 312 of broadcast bridge 302B responds to the PCI-X write command and asserts its busy output 426, according to block 604 of FIG. 6, as shown by arrow 2.

Write receive FIFO 492 of FIG. 4, included in send/receive FIFOs 304 of FIG. 8, provides the write data on PCI-X signals 324B to control logic 334C; control logic 334C selectively provides the write data to PCI-X interface 332C, which in turn provides the data on PCI-X bus 212A, according to blocks 622 and 624 of FIG. 6, as shown by arrow 3A. Simultaneously, broadcast FIFO 306 of FIG. 8 provides a copy of the write data on PCI-X signals 326B to control logic 334D; control logic 334D selectively provides the write data to PCI-X interface 332D, which in turn provides the data on PCI-X bus 212C, according to blocks 632 and 634 of FIG. 6, as shown by arrow 3B.

Figure 9:
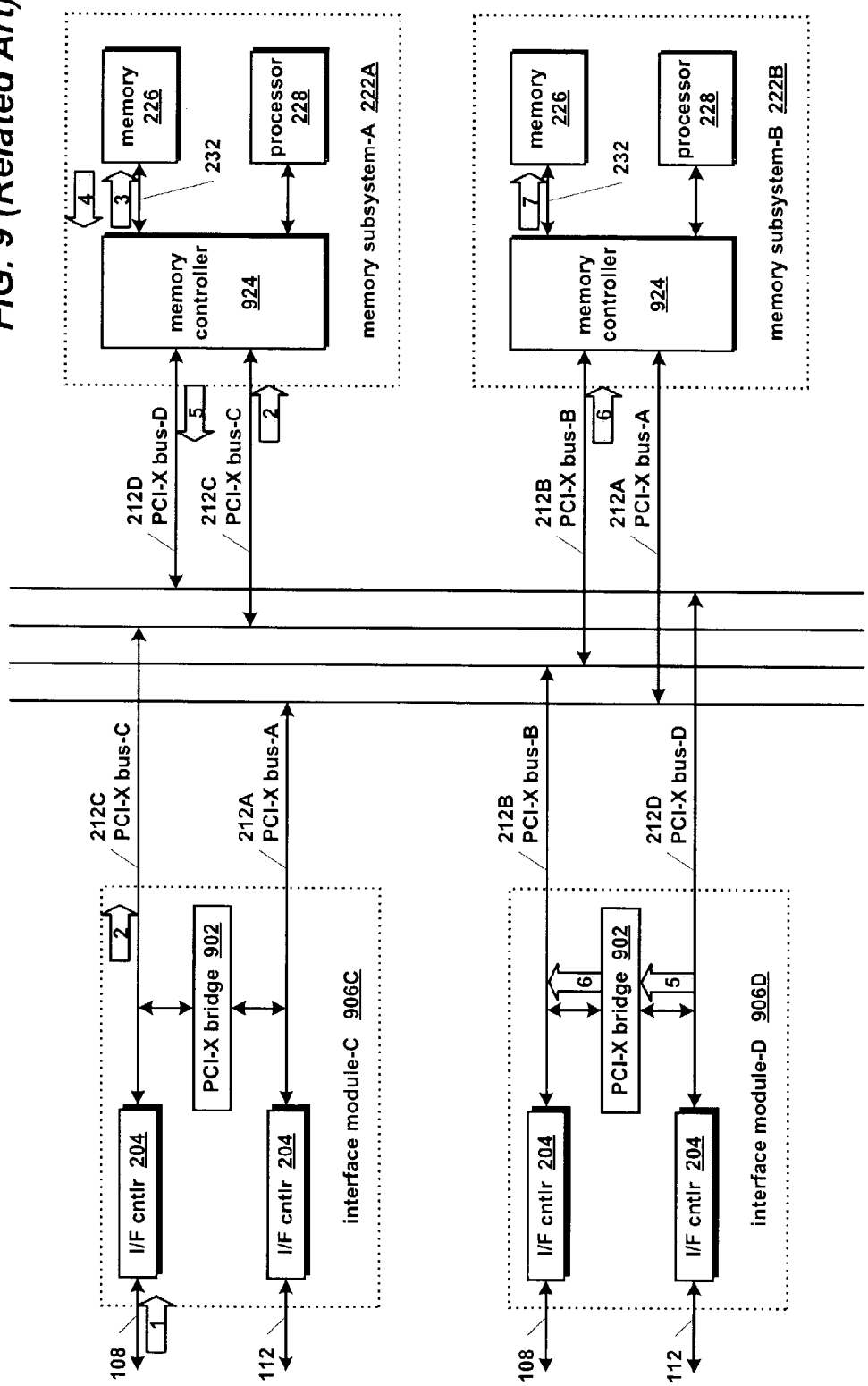
FIG. 9 is a block diagram of a related art conventional redundant network storage controller for illustrating data flow of a conventional mirrored write.

Referring now to FIG. 9, a block diagram of a related art conventional redundant network storage controller 900 for illustrating data flow of a conventional mirrored write is shown. Some elements of the conventional storage controller 900 are similar to elements of the redundant network storage controller 102 of FIG. 7, and like elements are numbered the same. FIG. 9 may be compared to FIG. 7 in order to more fully appreciate the advantages of the present invention over the conventional method. For simplicity and clarity, unlike the redundant network storage controller 102 of FIG. 7, the conventional storage controller 900 includes only two interface modules 906, denoted interface module-C 906C and interface module-D 906D, rather than the four interface modules 206 of FIG. 7.

There are three main differences between conventional storage controller 900 and redundant network storage controller 102 of FIG. 7. First, the PCI-X ports of the interface controllers 204 of FIG. 9 are coupled directly to the memory subsystems 222 via the PCI-X buses 212. That is, one of the interface controllers 204 of interface module 906C is coupled to PCI-X bus 212C and the other interface controller 204 is coupled to PCI-X bus 212A. Similarly, one of the interface controllers 204 of interface module 906D is coupled to PCI-X bus 212B and the other interface controller 204 is coupled to PCI-X bus 212D. Second, each of the interface modules 906 of the conventional storage controller 900 includes a two-ported PCI-X bridge 902 rather than the four-ported PCI-X bridge 202 of FIG. 7. PCI-X bridge 902 of interface module 906C couples PCI-X bus 212A and 212C. PCI-X bridge 902 of interface module 906D couples PCI-X bus 212B and 212D. Third, the memory controller 924 of FIG. 9 includes a DMA controller for performing data transfers between its memory 226 and its PCI-X buses 212.

A host transmits write data to conventional storage controller 900 of FIG. 9, as shown by arrow 1. The write data is received by the interface controller 204 of interface module 906C, which generates a PCI-X write command on PCI-X bus 212C to the primary memory subsystem-A 222A in response to reception of the host write data, as shown by arrow 2. The primary memory subsystem-A 222A receives the data and writes the data into its cache memory 226, as shown by arrow 3.

Subsequently, the processor 228 of the primary memory subsystem-A 222A receives notification of the transfer of the write data into its memory 226 and instructs the memory controller 924 to read the just-written write data from its memory 226, as shown by arrow 4, and to copy the write data out on PCI-X bus 212D to interface module-D 906D, as shown by arrow 5. PCI-X bridge 902 of interface module-D 206D receives the copy of the write data from the primary memory subsystem-A 222A and retransmits the PCI-X write command, including the copy of the write data, on PCI-X bus 212B to the secondary memory subsystem-B 222B, as shown by arrow 6. The secondary memory subsystem-B 222B receives the copy of the data and writes it into its cache memory 226, as shown by arrow 7.

As may be observed by comparing FIG. 7 and FIG. 9, the conventional storage controller 900 takes a substantially longer time to perform a mirrored write than the redundant network storage controller 102 of FIG. 7 since the conventional storage controller 900 performs its copy of the data to the secondary memory subsystem 222 in series with the write of the data to the primary memory subsystem 222; whereas, the redundant network storage controller 102 broadcasts the data to the secondary memory subsystem 222 simultaneously with the write of the data to the primary memory subsystem 222. In addition, because the redundant network storage controller 102 performs the broadcast write directly to the secondary memory subsystem 222, there is no need for the primary memory subsystem 222 to copy the data to the secondary memory subsystem 222, which makes more efficient use of the bandwidth of the PCI-X buses 212 and the bus between the memory 226 and memory controller 224. As may be observed, twice as much memory 226 bus bandwidth is consumed and 50% more PCI-X bus bandwidth 212 is consumed by the conventional storage controller 900 to perform a mirrored write than the redundant network storage controller 102 of the present invention.

Although the present invention and its objects, features, and advantages have been described in detail, other embodiments are encompassed by the invention. For example, although an embodiment has been described to broadcast write data to two redundant memory subsystems, i.e., to perform a mirrored write, the invention is adaptable to broadcast data to more than two redundant memory subsystems. In addition, although embodiments have been described with respect to the PCI-X bus, the invention is adaptable to work with other buses, such as the PCI bus, PCI Express bus, PCI-X2 bus, EISA bus, VESA bus, Futurebus, VME bus, MultiBus, RapidIO bus, AGP bus, ISA bus, 3GIO bus, Hypertransport bus, Fibre Channel, Ethernet, ATA, SATA, SCSI, Infiniband, etc. Furthermore, although an embodiment of the bus bridge has been described with a particular number of broadcast bridges, the number of broadcast bridges per bus bridge may be varied to meet the demands of the particular application in which the bus bridge is employed. Still further, although the invention has been described with respect to a single broadcast address range, multiple broadcast address ranges may be employed if desired. Finally, although an embodiment has been described having the write and broadcast FIFOs of a particular size, the size of the FIFOs may vary to meet the demands of the particular application in which the broadcast bridge is employed.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A broadcast bridge apparatus, comprising:
    a first port, for receiving data transmitted on a first local bus;
    a second port, coupled to said first port, for receiving said data from said first port and providing said data for retransmission on a second local bus to a first memory subsystem; and
    a third port, coupled to said first port, for receiving a copy of said data from said first port and selectively providing said copy of said data for retransmission on a third local bus to a second memory subsystem concurrently with said first port providing said data for retransmission on said second local bus to said first memory subsystem.

2. The apparatus of claim 1, wherein said first and second memory subsystems are redundant.

3. The apparatus of claim 1, wherein said data originates from a host computer and is destined to be written from one of said first and second memory subsystems to one or more storage devices.

4. The apparatus of claim 1, wherein said first memory subsystem is alleviated from copying said data to said second memory subsystem due to said third port providing said copy of said data.

5. The apparatus of claim 1, wherein said first port is configured to receive an address of said data from said first local bus, wherein said third port selectively provides said copy of said data to said second memory subsystem only if said address lies within one or more address ranges of said first local bus, wherein said one or more address ranges comprise a subset of an address space of said first local bus.

6. The apparatus of claim 5, wherein said one or more address ranges are predetermined.

7. The apparatus of claim 5, wherein said one or more address ranges are programmable.

8. The apparatus of claim 5, further comprising:
    a programmable control register, coupled to said third port, for storing a control value, wherein said third port selectively provides said copy of said data to said second memory subsystem only if said control value specifies said providing said copy of said data to said second memory subsystem and said address lies within said address range.

9. The apparatus of claim 1, further comprising:
a control register, coupled to said third port, for storing a control value, wherein said third port selectively provides said copy of said data to said second memory subsystem only if said control value specifies said providing said copy of said data to said second memory subsystem.

10. The apparatus of claim 9, wherein said control register is programmable.

11. The apparatus of claim 1, further comprising:
a first-in-first-out (FIFO) memory, coupling said first port to said third port, for selectively buffering said copy of said data.

12. The apparatus of claim 11, further comprising:
a second FIFO memory, coupling said first port to said second port, for buffering said data.

13. The apparatus of claim 1, further comprising:
communication logic, coupling said second port to said third port, whereby said first memory subsystem informs said second memory subsystem of said retransmission of said copy of said data to said second memory subsystem.

14. The apparatus of claim 1, wherein at least one of said first, second, and third local buses comprise a PCI-X (Peripheral Component Interconnect-X) bus.

15. The apparatus of claim 1, wherein at least one of said first, second, and third local buses comprise a Peripheral Component Interconnect (PCI) bus.

16. A bus bridge apparatus for broadcasting data from a first local bus on one side of the bridge to a plurality of redundant storage controllers coupled to second and third local buses on an opposite side of the bridge to relieve the redundant controllers from copying the data to one another, the apparatus comprising:
a first FIFO memory, coupled to receive data from the first local bus, said data associated with a first write transaction on the first local bus;
first master logic, coupled to said first FIFO memory, for causing a second write transaction on the second local bus to transfer said data from said first FIFO memory to a first of the plurality of redundant storage controllers;
a second FIFO memory, coupled to receive said data from the first local bus; and
second master logic, coupled to said second FIFO memory, for causing a third write transaction on the third local bus to transfer said data from said second FIFO memory to a second of the plurality of redundant storage controllers simultaneously with said transfer of said data from said first FIFO memory to said first of the plurality of redundant storage controllers.

17. The apparatus of claim 16, further comprising:
target logic, coupled to said first and second master logic, for receiving a write command of said first write transaction on the first local bus, and for generating first and second signals to said first and second master logic, respectively, to signify a transfer of said data into said first and second FIFO memories, respectively, in response to said first write transaction.

18. The apparatus of claim 17, wherein said first and second master logic generate third and fourth signals, respectively, to signify to said target logic completion of said second and third write transactions, respectively.

19. The apparatus of claim 16, wherein said first and second master logic comprise PCI-X master logic.

20. A PCI-X bus bridge, for bridging a first PCI-X bus to second and third PCI-X buses, comprising:
first, second, and third PCI-X interfaces, coupled to the first, second, and third PCI-X buses, respectively, said first PCI-X interface configured to receive a plurality of write transactions from the first PCI-X bus; and
a plurality of broadcast bridge circuits, coupling said first PCI-X interface to said second and third PCI-X interfaces, each for causing both of said second and third PCI-X interfaces to concurrently retransmit a respective one of said plurality of write transactions on the second and third PCI-X buses, respectively.

21. The apparatus of claim 20, further comprising:
first, second, and third multiplexing logic, coupled to said first, second, and third PCI-X interfaces, respectively, for selectively coupling said first, second, and third PCI-X interfaces, respectively, to one of said plurality of broadcast bridge circuits.

22. The apparatus of claim 21, wherein each of said plurality of broadcast bridge circuits includes a busy output for indicating whether said broadcast bridge circuit is currently servicing a PCI-X command.

23. The apparatus of claim 22, wherein said first, second, and third multiplexing logic selectively couples said first, second, and third PCI-X interfaces, respectively, to one of said plurality of broadcast bridge circuits based on said busy outputs.

24. A PCI-X bus bridge, comprising:
a PCI-X target circuit, for receiving a PCI-X write command from a first PCI-X bus coupled to one side of the bus bridge, said PCI-X write command specifying an address of data to be written;
a control input to said PCI-X target circuit, for indicating whether said address is within an address range of an address space of said first PCI-X bus;
a write FIFO, coupled to said PCI-X target circuit, for receiving said data from said first PCI-X bus for retransmission on a second PCI-X bus coupled to a side of the bus bridge opposite said first PCI-X bus; and
a broadcast FIFO, coupled to said PCI-X target circuit, for receiving a copy of said data from said first PCI-X bus for retransmission on a third PCI-X bus coupled to said opposite side of the bus bridge concurrently with said retransmission of said data on said second PCI-X bus, wherein said broadcast FIFO receives said copy of said data only if said address is within said address range.

25. The PCI-X bus bridge of claim 24, further comprising:
a first PCI-X master circuit, coupled to said PCI-X target circuit, for retransmitting said data on said second PCI-X bus from said write FIFO; and
a second PCI-X master circuit, coupled to said PCI-X target circuit, for retransmitting said copy of said data on said third PCI-X bus from said broadcast FIFO only if said address is within said address range.

26. The PCI-X bus bridge of claim 25, wherein said second PCI-X master circuit retransmits said copy of said data on said third PCI-X bus from said broadcast FIFO substantially simultaneously with said first PCI-X master circuit retransmitting said data on said second PCI-X bus from said write FIFO.

27. A method for selectively performing a broadcast data transfer across a bus bridge to a plurality of redundant memory subsystems in a storage controller, comprising:
receiving data on a first bus on one side of the bus bridge;

writing said data to a first of the plurality of memory subsystems on a second bus on an opposite side of the bus bridge from said first bus;

determining whether the bus bridge is enabled to perform broadcast data transfers; and writing a copy of said data to a second of the plurality of memory subsystems on a third bus on said opposite side of the bus bridge only if the bus bridge is enabled to perform broadcast data transfers, wherein the bus bridge writes said copy of said data to said second of the plurality of memory subsystems on said third bus concurrently with said writing said data to said first of the plurality of memory subsystems on said second bus.

28. The method of claim 27, further comprising:

receiving an address of said data on said first bus; and determining whether said address is within an address range, said address range being a subset of an address space of said first bus;

wherein said writing said copy of said data to said second of the plurality of memory subsystems is performed only if said address is within said address range.

29. The method of claim 27, further comprising:

storing said data into a first buffer in response to said receiving said data on said first bus and prior to said writing said data to said first of the plurality of memory subsystems;

storing said copy of said data into a second buffer concurrently with said storing said data into said first buffer only if the bus bridge is enabled to perform broadcast data transfers.

30. The method of claim 29, further comprising:

reading said data from said first buffer to provide said data for said writing said data to said first of the plurality of memory subsystems; and reading said copy of said data from said second buffer to provide said copy of said data for said writing said copy of said data to said second of the plurality of memory subsystems.

31. The method of claim 27, wherein said first, second, and third buses comprise PCI-X buses.

32. A redundant network storage controller, comprising:

at least one I/O interface circuit, for receiving data from a host computer and writing said data to one or more storage devices;

a primary memory subsystem, for buffering said data before being written to said storage devices;

a secondary memory subsystem, for storing a redundant copy of said data; and a plurality of bus bridges, for bridging a bus coupled to said at least one I/O interface circuit with a plurality of buses coupled to said primary and secondary memory subsystems, configured to write said data received on said bus concurrently to said primary and secondary memory subsystems on first and second of said plurality of buses, respectively.

33. The controller of claim 32, wherein each of said plurality of bus bridges comprises:

a first port for coupling to said bus coupled to said at least one I/O interface circuit;

a second port for coupling to said first of said plurality of buses coupled to said primary memory subsystem; and a third port for coupling to said second of said plurality of buses coupled to said secondary memory subsystem.

34. The controller of claim 33, wherein each of said plurality of bus bridges further comprises:

a first buffer, coupling said first and second ports, for buffering said data between said bus and said first of said plurality of buses; and a second buffer, coupling said first and third ports, for buffering said data between said bus and said second of said plurality of buses.

35. The controller of claim 32, wherein said primary memory subsystem updates said secondary memory subsystem with information specifying a presence of said data in said secondary subsystem after said data is written to said secondary memory subsystem.

* * * * *